United States Patent [19]

Kim

[11] Patent Number: 5,592,322
[45] Date of Patent: Jan. 7, 1997

[54] LASER BEAM MODULATION APPARATUS

[75] Inventor: Jung-Gyu Kim, Seoul, Rep. of Korea

[73] Assignee: Daewoo Electronics Co., Ltd., Seoul, Rep. of Korea

[21] Appl. No.: 524,012

[22] Filed: Sep. 5, 1995

[51] Int. Cl.$^6$ .................................................. H04B 10/04
[52] U.S. Cl. ......................... 359/184; 359/181; 359/107; 369/116
[58] Field of Search .................................. 359/181, 188, 359/107, 180, 158, 184, 185, 186; 369/116, 121; 372/26, 38

[56] References Cited

U.S. PATENT DOCUMENTS 4,709,417  9/1987  Kuwabara ............................. 359/180
5,291,470  3/1994  Nishiuchi ............................. 369/116

Primary Examiner—Wellington Chin
Assistant Examiner—Kinfe-Michael Negash
Attorney, Agent, or Firm—Anderson, Kill & Olick

[57] ABSTRACT

A laser beam modulation apparatus modulates a EFM (eight-fourteen modulated) signal to generate as a laser power control signal a pulse modulated EFM signal (PM-EFM). During each of on-time intervals of the EFM signal, the pulse modulated EFM signal serves to apply the laser beam on a recording area on a phase-change disk and to undulate the laser beam in order to prevent an overheating of the recording area.

3 Claims, 2 Drawing Sheets

LASER BEAM MODULATION APPARATUS

FIELD OF THE INVENTION

The present invention relates to an optical disk recording apparatus for writing arbitrary data on a rewritable optical disk; and, more particularly, to a laser beam modulation apparatus for recording digital data on a rewritable optical disk using a phase-change recording method.

BACKGROUND OF THE INVENTION

In general, optical recording media offer a number of advantages over conventional magnetic tapes or disks in that the former have the ability to store binary data at a high recording density and good reliability for an extended period of service time. Examples of such optical recording media include a magneto-optical disk, a phase-change disk, a write-once read many memory and a compact disk all being designed to store data/information in an optically readable condition. Among them, a magneto-optical disk and a phase-change disk are characterized by the added advantages of data erasability and rewritability, which make them more attractive than the other types of optical recording media.

As well known in the art, digital data is written on a recording layer of such rewritable optical disks by the radiation of a laser beam. The magneto-optical disk records data with heat generated by the laser beam and magnetization characteristics of a magnetic recording layer thereon. On the other hand, the phase-change disk records data using a phase-change recording technique wherein the laser beam is intensity modulated so that a crystallized recording layer thereof goes through a phase change between a crystalline phase and an amorphous phase. Such modulation is normally done by a modulation system generally called an EFM (eight-to-fourteen modulation) system to modulate the laser beam so that a data modulated signal representing digital data, e.g., an EFM signal, is recorded on the optical disk by the modulated laser beam.

However, in the phase-change recording technique, as shown in FIG. 3, tear drops 76 due to thermal diffusion by the Laser beam may occur on a crystallized recording area 72 of a phase-change disk 70, which tends to increase the recording error rate.

In order to overcome the above disadvantage, efforts have been made to find ways of reducing the laser power requirement to prevent the thermal diffusion over the recording area. However, in this case, an recording area having a shortest bit length, e.g., 3T, where T represents a clock pulse period, may be made unstable due to the failure to provide to that area a required level of laser power.

SUMMARY OF THE INVENTION

It is, therefore, an object of the present invention to provide a laser beam modulation apparatus capable of controlling a laser beam to reduce thermal diffusion on a recording area of a rewritable optical disk during a recording operation.

It is another object of the present invention to provide a laser beam modulation apparatus for controlling a laser beam with a simplified circuit construction.

In accordance with the present invention, there is provided a laser beam modulation apparatus for controlling a laser beam, wherein the laser beam is controlled by on-time and off-time intervals of a data modulated signal to be recorded on a rewritable optical disk, which comprises:

means for generating a pulse modulation prohibition window signal having a first window pulse width of a fixed time period in synchronization with each of positive-directional transitions of the data modulated signal, wherein the pulse modulation prohibition window signal prohibits the pulse modulation of the data modulated signal during the first window width of the fixed time period;

means for logically combining the pulse modulation prohibition window signal and the data modulated signal during the on-time interval using an exclusive addition to produce a pulse modulation permission window signal having a second window pulse width, wherein the pulse modulation permission window signal allows the modulation of the data modulated signal during the second window pulse width;

means for generating a clock pulse having a predetermined period;

means for performing a logical multiplication on the clock pulse and the pulse modulation permission window signal to produce a pulse modulated signal; and means for performing a logical addition of the pulse modulated signal and the pulse modulation prohibition window signal to produce a laser beam control signal.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Figure 1:
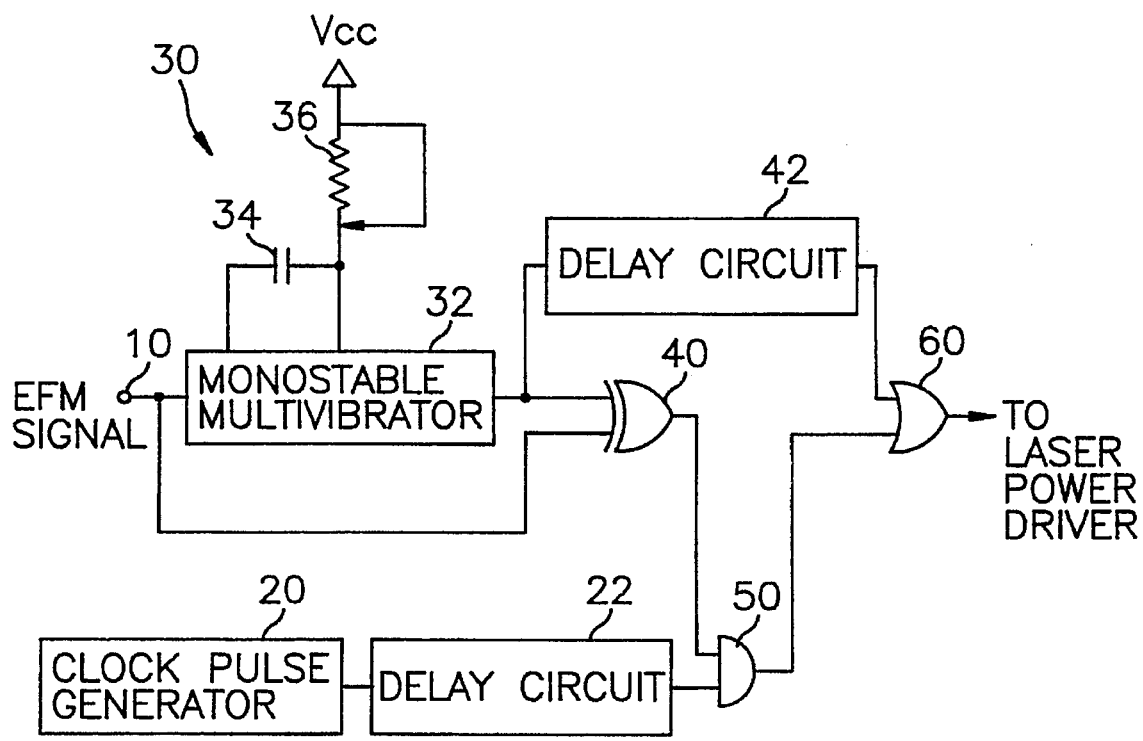
FIG. 1 shows a block diagram of a laser beam modulating apparatus in accordance with the present invention.
Figure 3:
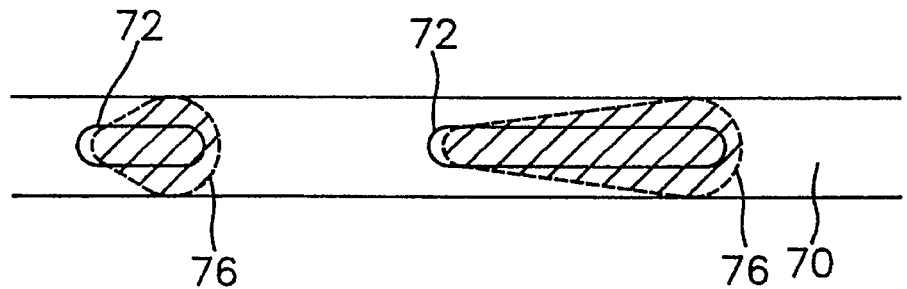
FIG. 3 presents an exaggerated view illustrating the occurrence of tear drops on a recording area of a writable optical disk.
Figure 2A:
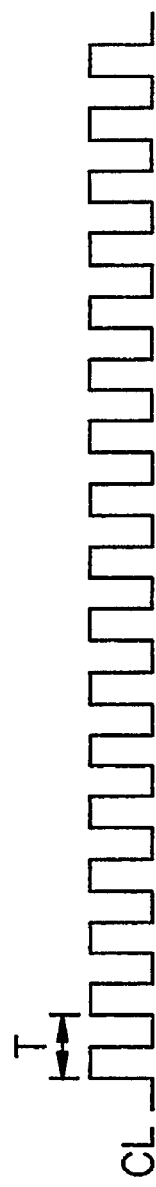
FIGS. 2A to 2G represent waveforms generated from parts of the laser beam modulation apparatus shown in FIG. 1, respectively.
Figure 2B:

Referring to FIG. 1, there is shown a block diagram of a laser beam modulation apparatus capable of controlling the intensity of a laser beam in accordance with the present invention. The laser beam modulation apparatus is shown to include an input unit 10 to receive an eight-fourteen modulated ("EFM") pulse signal and a clock pulse generator 20 for generating a reference sampling clock pulse having a predetermined period "T" of frequency 4.32 MHz as shown in FIG. 2A. The EFM signal represents digital data to be recorded onto a rewritable optical disk, e.g., a phase-change disk, through the use of laser beam, consisting of a sequence of on-time and off-time intervals of logic high and low levels. The laser beam is controlled by the on-time and off-time intervals in the EFM signal. As shown in FIG. 2B, the on-time intervals in the EFM signal may have lengths from 3T to 11T during which time the laser beam is radiated onto the phase-change disk to record the digital data in synchronization with the clock pulse. In FIG. 2B, the EFM signal is illustrated to have the on-time intervals of 3T and 7T.

Figure 2C:
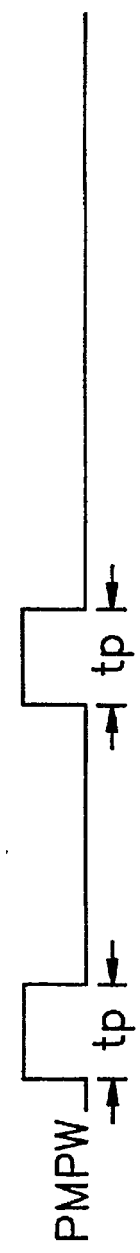

The EFM pulse signal is applied to a pulse modulation prohibition window signal generator 30 and a first of input to a pulse modulation permission window signal generator 40. The pulse modulation prohibition window signal generator 30 includes a one-shot multivibrator or mono-stable multivibrator 32 and a time constant circuitry with a capacitor 34 and a variable resistor 36. The pulse modulation prohibition window signal generator 30, in synchronization with each of positive-directional transitions of the EFM signal, generates a pulse modulation prohibition window signal "PMPW" having a window pulse width of a fixed time period "$t_p$", as shown in FIG. 2C. The fixed time period $t_p$ is usually determined by the time constant circuit. During the fixed time period $t_p$, modulation of the EFM signal is prohibited so that the laser beam is radiated onto a crystallized recording area of the phase-change disk. In accordance with the present invention, the fixed time period is preferably set to 1.5T which is deemed sufficient to heat the recording area by the laser beam to a desired melting point level and form an amorphous phase. The pulse modulation prohibition window signal PMPW is then provided to a second input of the pulse modulation permission window pulse generator 40 and a first input of a pulse modulated signal generator 60 through a delay circuit 42.

Figure 2D:
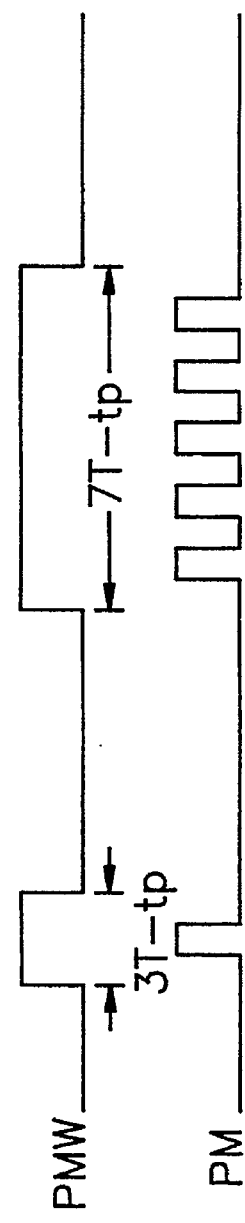

The pulse modulation permission window signal generator 40, which is of an exclusive OR gate, operates an exclusive OR on the pulse modulation prohibition window signal PMPW and the EFM signal to thereby generate a pulse modulation permission window pulse "PMW" having window intervals (3T–$t_p$) and (3T–$t_p$) of logic high level as shown in FIG. 2D. The pulse modulation permission window signal PMW allows the modulation of the EFM signal during each of the window intervals. The pulse modulation permission window signal is supplied to a first input of the pulse modulation signal generator 50 wherein the clock pulse is applied to a second input via a delay circuit 22.

Figure 2E:
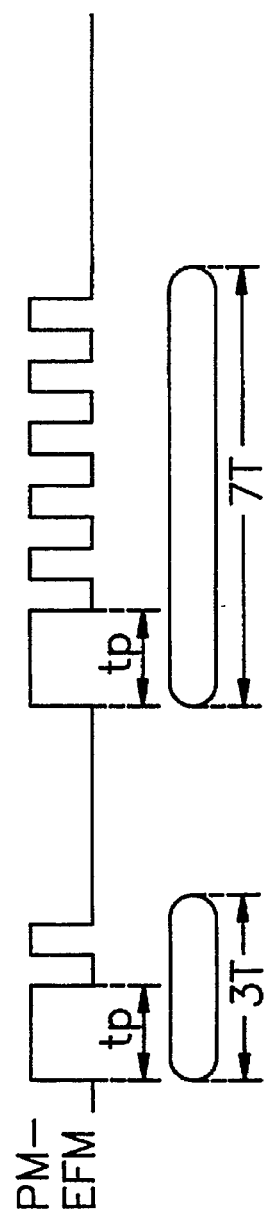

The pulse modulation signal generator 50, which includes an AND circuit, logically combines the pulse modulation permission window signal PMW and the clock pulse CK using AND multiplication to generate a pulse modulated signal "PM" as shown in FIG. 2E. The pulse modulated signal PM is then fed to a second input of the pulse modulated EFM signal generator 60, which is of an OR gate circuit.

Figure 2F:
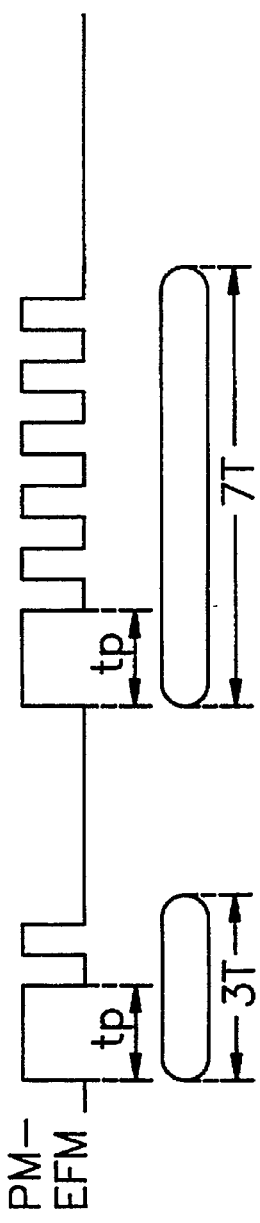
Figure 2G:
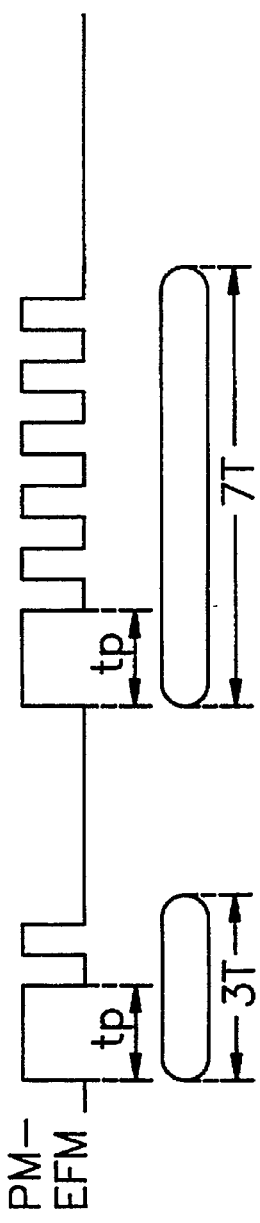

At the pulse modulated EFM signal generator 60, the pulse modulated signal PM is logically combined with the pulse modulation prohibition window signal PMPW using an OR operation to obtain a pulse modulated EFM signal "PM-EFM" as shown in FIG. 2F. Consequently, during the on-time interval of the length 3T or 7T in the EFM signal, the pulse modulated EFM signal PM-EFM has a first portion which holds the EFM signal for the pulse modulation prohibition window width $t_p$; and a second portion which follows the clock pulse for the pulse modulation permission window interval. The first pulse portion serves to apply the laser beam to the recording area on the optical disk and the second pulse portion functions to undulate the laser beam in order to prevent an overheating of the recording area. Accordingly, when the pulse modulated EFM signal PM-EFM is provided to a laser power driver as a laser power control signal, the laser beam is controlled by the pulse modulated EFM signal PM-EFM in such a manner that the recording area is sufficiently heated to undergo a phase change for the 1.5T interval of the EFM signal and heat is supplied during each of the on-time intervals of the EFM signal to convert the recording area to the amorphous state, to thereby prevent the heat caused by the laser beam from spreading over the recording area. As a result, it is possible to obtain a desired recording area free from the tear drop problem, as shown in FIG. 2G, to thereby improve the recording error rate.

While the present invention has been described with respect to the particular embodiments described above, it will be apparent to those skilled in the art that various changes and modifications may be made without departing from the spirit and scope of the invention as defined in the following claim.

What is claimed is:

1. A laser beam modulation apparatus for controlling a laser beam, wherein the laser beam is controlled by on-time and off-time intervals of a data modulated signal to be recorded on a rewritable optical disk, wherein the apparatus comprises:

means for generating a pulse modulation prohibition window signal having a first window pulse width of a fixed time period in synchronization with each of positive-directional transitions of the data modulated signal, wherein the pulse modulation prohibition window signal prohibits the pulse modulation of the data modulated signal during the first window width of the fixed time period;

means for logically combining the pulse modulation prohibition window signal and the data modulated signal during the on-time interval using an exclusive addition to produce a pulse modulation permission window signal having a second window pulse width, wherein the pulse modulation permission window signal allows the modulation of the data modulated signal during the second window pulse width;

means for generating a clock pulse having a predetermined period;

means for performing a logical multiplication on the clock pulse and the pulse modulation permission window signal to produce a pulse modulated signal; and means for performing a logical addition of the pulse modulated signal and the pulse modulation prohibition window signal to produce a laser beam control signal.

2. The apparatus of claim 1, wherein the pulse modulation prohibition window signal generating means includes a monostable multivibrator and a time constant circuit to determine the first window width of the fixed time period.

3. The apparatus of claim 2, wherein the fixed time period is set to have a sufficient duration to heat a crystallized recording area on the rewritable optical disk by the laser beam to change the phase of the recording area from a crystalline state to an amorphous state.

* * * * *